Aug. 13, 1963 W. KEMPF 3,100,660
PIPE CONNECTION, ESPECIALLY FOR UNIVERSAL
JOINT SHAFTS AND THE LIKE
Filed Jan. 25, 1960 2 Sheets-Sheet 1
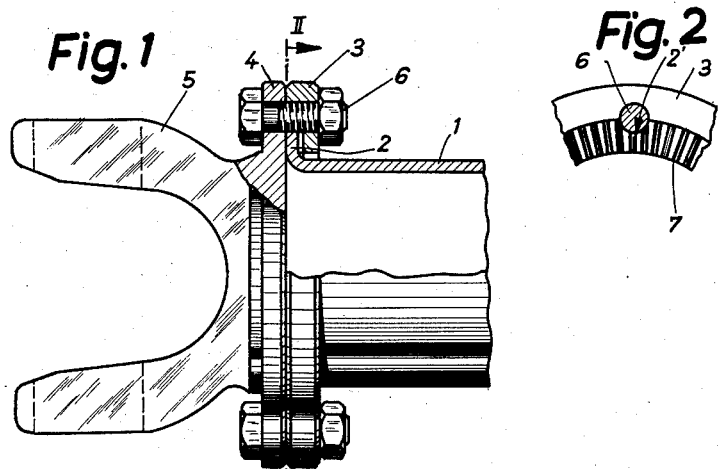
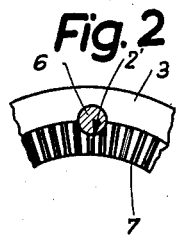
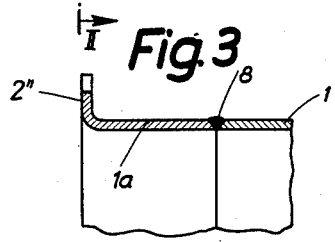
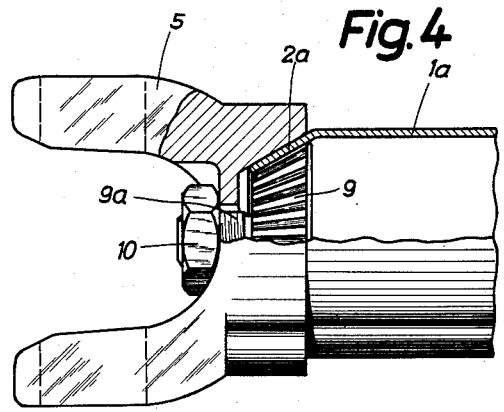

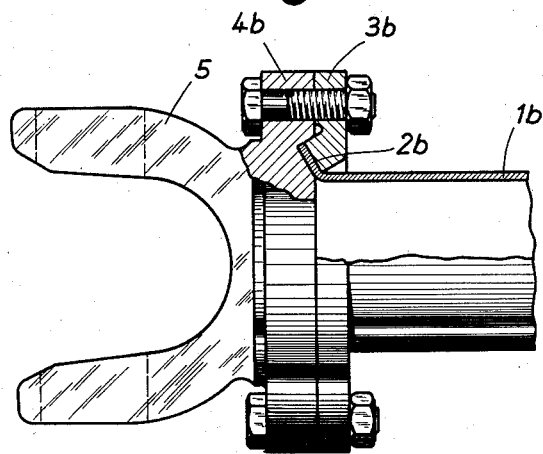
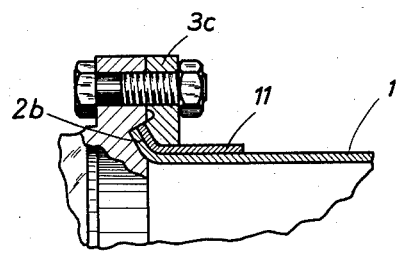
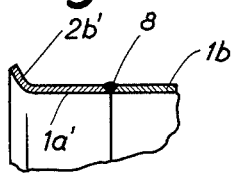

United States Patent Office 3,100,660
Patented Aug. 13, 1963

3,100,660
PIPE CONNECTION, ESPECIALLY FOR UNIVERSAL JOINT SHAFTS AND THE LIKE
Willi Kempf, Essen, Germany, assignor to Gelenkwellenbau G.m.b.H., Essen, Germany
Filed Jan. 25, 1960, Ser. No. 4,265
Claims priority, application Germany Jan. 27, 1959
2 Claims. (Cl. 287—53)

The present invention relates to a pipe connection for universal joint shafts and the like, and, more specifically, concerns a connection of a pipe end with a universal joint shaft having a fork-type joint. It is known to provide the pipe end with a flange adapted to be connected with the flange of the fork-shaped portion of the joint. The provision of special pipe flanges, however, is cumbersome and expensive.

It is therefore an object of the present invention to provide an arrangement which will overcome the above-mentioned drawback.

It is another object of this invention to provide a pipe connection for universal joint shafts and the like which will obviate the provision of a special or separate flange on the pipe end, as was heretofore customary.

These and other objects and advantages of the invention will appear more clearly from the following specification in connection with the accompanying drawings, in which:

FIGURE 1 illustrates, partly in side view and partly in section, a pipe connection according to the present invention.

FIGURE 2 shows a section along the line II—II of FIGURE 1.

FIGURE 3 shows a modification of an element of FIGURE 1.

FIGURE 4 illustrates, partially in side view and partially in section, a modified pipe connection according to the invention.

FIGURE 5 is a side view and partial section of still another modification of a pipe connection according to the invention.

FIGURES 6 and 7 illustrate modifications of elements of FIGURE 5.

The pipe connections according to the present invention is characterized primarily in that the pipe end to be connected to a universal joint shaft is bent outwardly so as to form a connecting collar which is pressed against the fork-shaped joint by means of a pressing member. Such an arrangement results in a considerably simplified but nevertheless safe and reliable connection between the universal joint, shaft pipe and and the follower fork. According to one embodiment which has proved highly successful in practice, the pipe end is deformed to an outwardly extending flange which is pressed against the flange of the joint by means of a pressure ring. However, the pipe end may also be bent into an inwardly directed flange which, by a correspondingly conically-shaped pressure member, is pressed against the fork-shaped joint.

In order to assure a proper transmission of the torque, the pipe flange and/or the pressure member may be profiled as, for instance serrated or corrugated, for increasing the friction.

In order to avoid a deforming of the pipe end, also a separate element may be employed which is provided with a corresponding flange and is welded or otherwise connected to the pipe.

For purposes of further increasing the torque, the flange of the pipe end may also be provided with recesses, bores, or the like for receiving threaded bolts.

For purposes of increasing the clamping effect, especially when thin-walled pipes are employed, an insert as, for instance, a pipe connection, may be provided at the clamping points.

Referring now to the drawings in detail, and FIGURES 1 and 2 thereof in particular, it will be noted that the pipe 1 is provided with a collar 2 which is pressed against fork 5 of the joint by means of a ring 3. Bolts 6 are provided for exerting clamping pressure.

In conformity with the showing in FIGURE 2, the collar 2 may be provided with profiles 7 for improving the torque transmission. Furthermore, the screw bolt 6 may penetrate into the peripheral portion of the collar 2 to assure the torque transmission. To this end, collar 2 is provided with corresponding recesses 2' for the bolts 6.

FIGURE 3 illustrates that the collar 2″ may be provided on an independent structural element 1a, which latter is connected to pipe 1 by a welding seam 8. Such a design considerably simplifies stock-keeping.

FIGURE 4 illustrates a pipe connection somewhat similar to that of FIGURE 1 but differing therefrom inasmuch as the end of the pipe 1a is bent inwardly so as to form a flange 2a. Into this inwardly bent or tapering end there is inserted a pressure member 9 which is pressed against fork 5 by means of a nut 10 engaging a threaded section 9a of the pressure member 9. Also in this instance, the pressure member 9 may be profiled e.g. serrated, in order to increase the friction.

A still further modification of a pipe connection according to the invention is shown in FIGURE 5, which is very similar to that of FIGURE 1 with the exception that, according to FIGURE 5, the collar 2b is bent so that it forms an obtuse angle with the axis of pipe 1. The clamping ring 3b is shaped accordingly. This design has the advantage that it can be more easily manufactured than the design of FIGURE 1.

FIGURE 6 illustrates that with the arrangement of FIGURE 5, it is also possible to design the collar 2b' as a separate pre-stressed member 1a' and then to connect the member 1a' by welding to the pipe 1b.

If the fork 5 consists of a synthetic material or the like, a simple clamping connection according to FIGURE 1 or 5 may, under certain circumstances, cause difficulties particularly when the pipe is relatively thin. In such an instance, an insert 11 may be arranged according to FIGURE 7 between the ring member 3c and the collar 2b, said insert 11 being designed as a pipe section.

It is, of course, to be understood that the present invention is, by no means, limited to the particular constructions shown in the drawings, but also comprises any modifications within the scope of the appended claims.

What I claim is:

1. In combination with a universal joint fork having a flange: a tubular shaft having a conically shaped end tapered toward said universal joint fork, said universal joint fork being provided with a conical recess for receiving said conically shaped end, a pressure member having a conical portion engaging the inside of said conically shaped end and being provided with a threaded stud extending through the flange of said universal joint fork, and nut means engaging said threaded stud from that side of the flange of said universal joint fork which is remote from said conical recess for firmly securing said tubular shaft to said universal joint fork.

2. In combination with a universal joint fork having a flange with a conically tapering recess: a tubular shaft having a connecting collar tapering in conformity with the taper of said conically tapering recess of said flange and extending into said recess so as to engage said universal joint fork, a pressure member engaging said tapering collar, and bolt means extending through said universal joint fork and operable to press said pressure member against said collar and thereby frictionally locking said collar and said tubular shaft to said universal joint fork.

References Cited in the file of this patent

UNITED STATES PATENTS

| | | |
|---|---|---|
| 98,960 | Harrison | Jan. 18, 1870 |
| 279,415 | Miller | June 12, 1883 |
| 406,060 | Patts | July 2, 1889 |
| 986,506 | Sargent | Mar. 14, 1911 |
| 2,464,744 | Fennema | Mar. 15, 1949 |

FOREIGN PATENTS

| | | |
|---|---|---|
| 110,079 | Great Britain | Oct. 11, 1917 |